United States Patent [19]

Rydbeck

[11] Patent Number: 5,590,417
[45] Date of Patent: Dec. 31, 1996

[54] RADIOTELEPHONE APPARATUS INCLUDING A WIRELESS HEADSET

[75] Inventor: Nils Rydbeck, Cary, N.C.

[73] Assignee: Ericsson Inc., Research Triangle Park, N.C.

[21] Appl. No.: 396,327

[22] Filed: Feb. 28, 1995

Related U.S. Application Data

[63] Continuation of Ser. No. 70,813, Jun. 3, 1993, abandoned.

[51] Int. Cl.⁶ .................................................. H04B 1/40
[52] U.S. Cl. .......................... 455/89; 455/44; 455/90; 455/351; 455/349; 379/428; 379/433
[58] Field of Search ........................ 455/89, 90, 67.1, 455/100, 348, 349, 351, 343, 88, 69, 63, 44, 70, 350; 379/61, 430, 433, 428; 381/183, 187, 68.7, 25

[56] References Cited

U.S. PATENT DOCUMENTS

| | | | |
|---|---|---|---|
| 3,195,047 | 7/1965 | Ruthroff | 455/44 |
| 3,271,679 | 9/1966 | Fostoff | 455/44 |
| 4,092,502 | 5/1978 | Jones. | |
| 4,334,315 | 6/1982 | Ono et al.. | |
| 4,593,155 | 6/1986 | Hawkins | 455/88 |
| 4,654,883 | 3/1987 | Iwata. | |
| 4,745,632 | 5/1988 | Duffy. | |
| 4,752,949 | 6/1988 | Steinbeck et al. | 379/61 |
| 4,845,751 | 7/1989 | Schwab. | |
| 4,905,270 | 2/1990 | Ono. | |
| 4,930,148 | 5/1990 | Lee. | |
| 4,969,180 | 11/1990 | Watterson et al.. | |
| 5,001,763 | 3/1991 | Moseley | 381/71 |
| 5,009,644 | 4/1991 | McDonald. | |
| 5,043,739 | 8/1991 | Logan et al.. | |
| 5,068,669 | 11/1991 | Koert et al.. | |
| 5,099,514 | 3/1992 | Acree. | |
| 5,113,428 | 5/1992 | Fitzgerald. | |
| 5,138,651 | 8/1992 | Sudo. | |
| 5,177,784 | 1/1993 | Hu et al. | 381/183 |
| 5,179,724 | 1/1993 | Lindoff | 455/343 |
| 5,182,774 | 1/1993 | Bourk. | |
| 5,191,602 | 3/1993 | Regen et al. | 379/430 |
| 5,278,893 | 1/1994 | Voser et al. | 455/89 |
| 5,365,573 | 11/1994 | Sakamoto et al. | 379/61 |
| 5,373,548 | 12/1994 | McCarthy | 455/67.1 |

FOREIGN PATENT DOCUMENTS

| | | |
|---|---|---|
| 4310873 | 10/1994 | Germany. |
| 2277422 | 10/1994 | United Kingdom. |
| WO89/09524 | 10/1989 | WIPO. |
| 9103891 | 3/1991 | WIPO ..................... 455/68 |
| WO92/00640 | 1/1992 | WIPO. |

OTHER PUBLICATIONS

Patent Abstracts of Japan, vol. 16, No. 492 (E–1278), 12 Oct. 1992 (JP–A–04 180329).

Patent Abstracts of Japan, vol. 16, No. 389 (E–1250), 19 Aug. 1992 (JP–A–04 127644).

Primary Examiner—Reinhard J. Eisenzopf
Assistant Examiner—Doris To
Attorney, Agent, or Firm—Burns, Doane, Swecker & Mathis, L.L.P.

[57] ABSTRACT

A radiotelephone includes a multifunctional headset that operates in two different modes. According to a first mode, the headset may be mounted on a radiotelephone body where it serves as a speaker and microphone for the radiotelephone. Also, the headset can be separated from the body of the portable radiotelephone and placed on the head of the user. In this mode of operation, the headset receives and transmits signals from and to the radiotelephone body during a call, thus providing hands-free operation. The headset can be attached to a user's head by an ear clip. The headset and body may include low power RF transceivers. The headset may contain power saving circuitry to minimize power drain from an internal battery. The battery may be recharged whenever the headset is fixed to the radiotelephone.

13 Claims, 6 Drawing Sheets

RADIOTELEPHONE APPARATUS INCLUDING A WIRELESS HEADSET

This application is a continuation of application Ser. No. 08/070,813, filed Jun. 3, 1993 now abandoned.

BACKGROUND

The present invention relates to a radiotelephone apparatus including a wireless headset. More particularly, it relates to a multi-functional, wireless, hands-free headset which is separable from a radiotelephone apparatus.

In recent years, the use of hand-held, portable radiotelephones has increased dramatically. Accompanying an increase in use of such portable radiotelephones has been a desire for easy and convenient operation of these devices. In particular, manufacturers of mobile cellular radiotelephones have long sought to provide efficient hands-free operation. In automobiles, for example, it is desirable to provide hands-free telephones for driver safety and convenience. With hands-free operation, the driver of a vehicle may use both hands to control the automobile.

One method of hands-free operation can be achieved by simply increasing the gain of the telephone's microphone and speaker to allow a user to speak and listen from some distance from the unit. Such a telephone is commonly referred to as a speakerphone. However, several problems are associated with a system constructed in this manner. For example, feedback and interference from ambient noise often make it difficult to clearly understand the words of the user. To help offset problems due to ambient noise, the microphone gain can be reduced by placing an external microphone connected via a wire to the main body of the radiotelephone close to the user's mouth. Nevertheless, the telephone speaker must still operate at high volume thereby diminishing the privacy of the received call.

Figure 1:
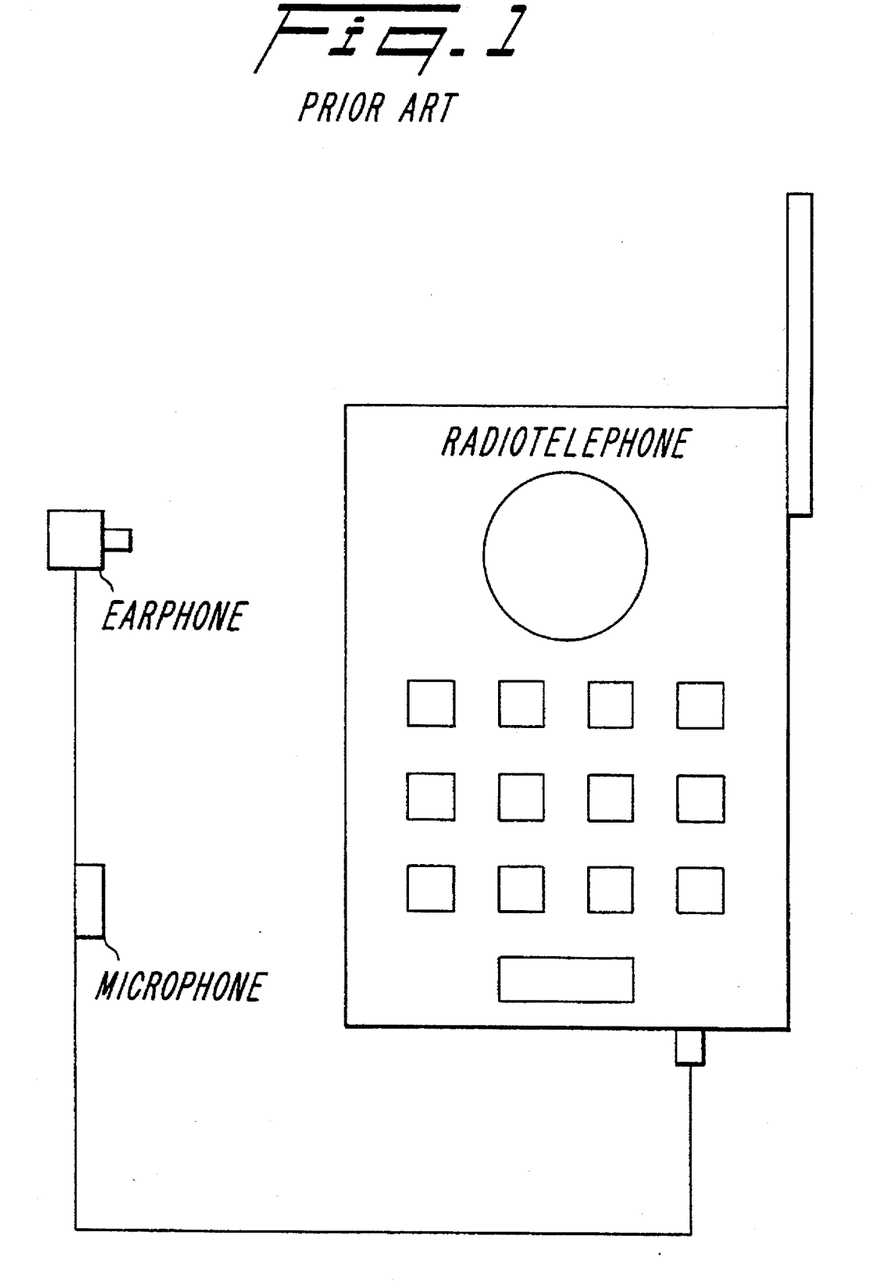
FIG. 1 is a radiotelephone apparatus according to a conventional system.

Another solution is a headset with a microphone and earphone as shown in FIG. 1. A cable connects the headset to the main telephone apparatus. Although having improved performance and privacy, the headset must still be wired to the radiotelephone unit. Wire connections are often inconvenient for use with a portable radiotelephone.

SUMMARY

To overcome the drawbacks of conventional radiotelephone units, the present invention employs a wireless means for communicating between a headset and a portable radiotelephone unit. Further, the headset operates in two modes. According to a first mode, the headset may be mounted on the radiotelephone where it serves as a speaker and microphone. Also, the headset can be separated from the body of the radiotelephone and placed on the head of the user. In this mode of operation, the headset receives and transmits communication signals from and to the body of the radiotelephone during a call, thus providing hands-free operation.

According to one embodiment of the present invention, a radiotelephone apparatus includes a body having means for communicating with a radiotelephone network and a headset separable from the body. The headset and body include respective means for electrically or wirelessly communicating. When the headset is attached to the body, the headset and body electrically communicate. When the headset is detached from the body, the headset wirelessly communicates with the communicating means. At least part of the headset can be mounted within the body when the headset is attached to the body.

The headset includes various components, such as a means for receiving a modulated carrier signal from the communicating means in the body, means for recovering an audio signal from the modulated carrier signal, means for amplifying the audio signal, and means for converting the audio signal to a sound signal. Several types of modulation may be used in communicating the audio signal. For example, it is possible to use frequency modulation or pulse width modulation.

Also, the body may include means for controlling the gain of the headset's amplifying means. The converting means can be a dynamic speaker or a piezoelectric transducer. The headset is removably attachable to a user's head, typically by an ear clip which fits behind the user's ear. The headset may further include a rechargeable battery for supplying power to the transceiver means and the amplifying means. The rechargeable battery may be recharged by the radiotelephone body when the headset is attached thereto.

Several advantages are realized by the present invention, including improved performance in the handsfree operation of a portable radiotelephone. For example, hands-free operation can be provided with increased privacy and convenience.

BRIEF DESCRIPTION OF THE DRAWINGS

The present invention will now be described in more detail with reference to preferred embodiments, given only by way of example and illustrated in the accompanying drawings, in which.

DETAILED DESCRIPTION

While the following description is in the context of cellular communication systems involving portable or mobile radiotelephones and/or personal communication networks, it will be understood by those skilled in the art that the present invention may be applied to other communication applications.

Figure 2A:
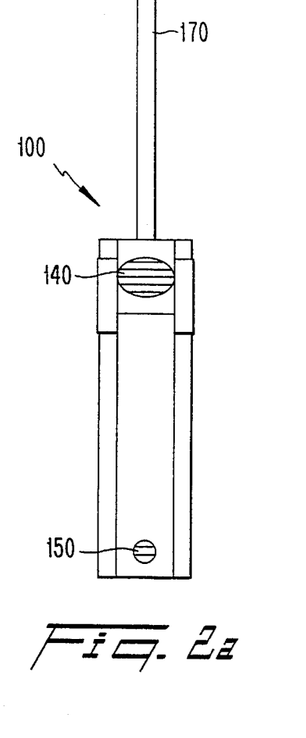
FIGS. 2a–2c are side and front views of a radiotelephone apparatus in accordance with Applicant's invention.
Figure 2B:
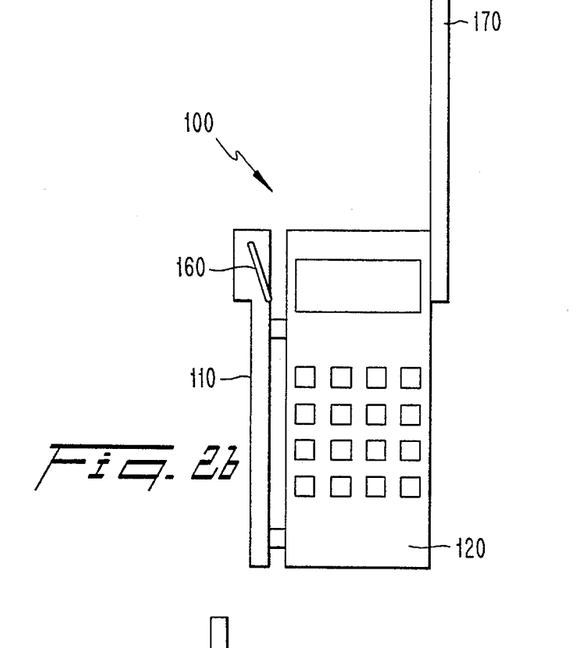
Figure 2C:
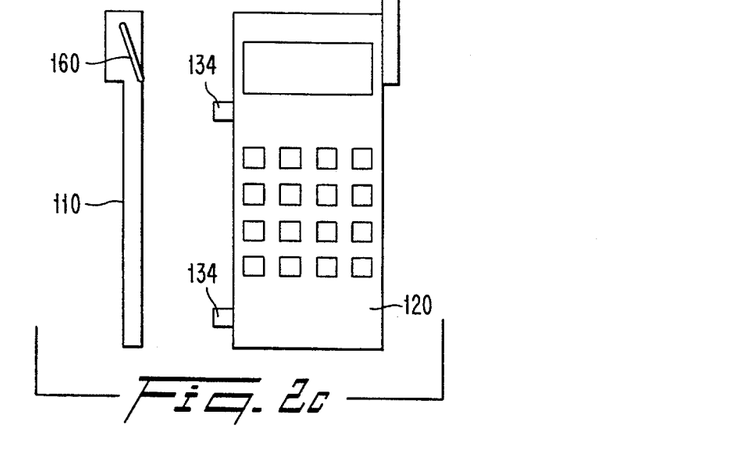

FIG. 2a shows a side view and FIGS. 2b, 2c show front views of a portable telephone unit 100 according to the present invention. A dual-purpose headset 110 is separable from the body 120 of the radiotelephone as shown in FIG. 2c. The headset 110 may be electrically connected to the body 120 via contacts on posts 134 or the headset may be in wireless communication with the body even when the headset is attached to the body. When the headset is detached from the body, it is in wireless communication with the body. Wireless communication between the headset and body may be carried out in a variety of ways including via radio frequency signals, ultrasonic signals, and infrared signals. An antenna 170 on the body is provided for communicating with a radiotelephone network.

Figure 3A:
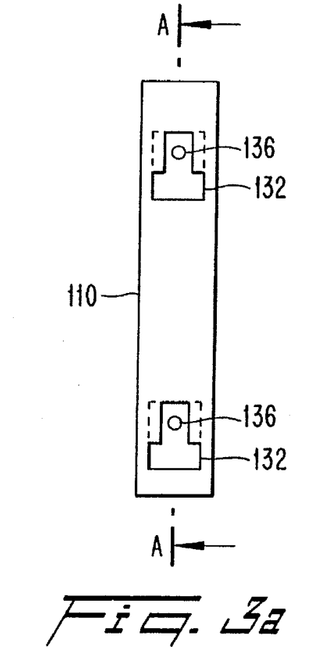
FIGS. 3a–3c illustrate attachment of a headset to a radiotelephone body in accordance with Applicant's invention.
Figure 3B:
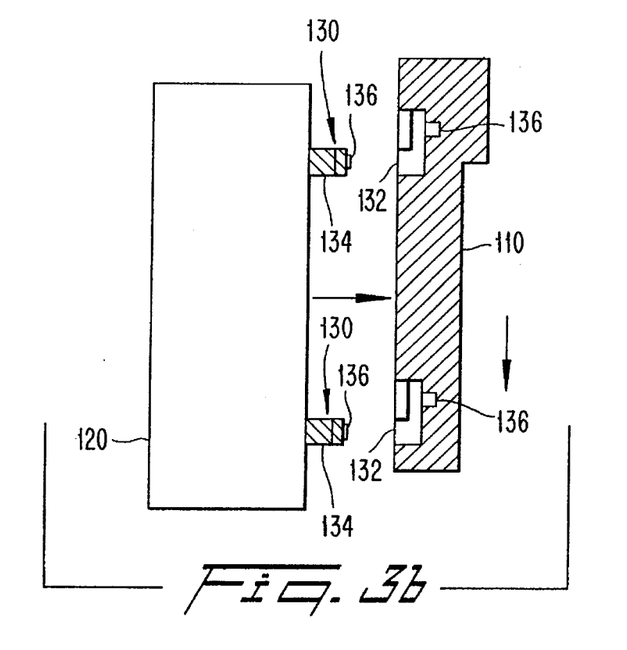
Figure 3C:
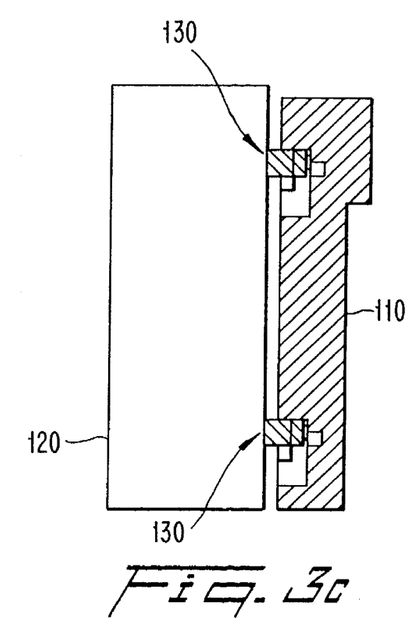

In accordance with Applicant's invention, when the headset 110 is attached to the radiotelephone body 120, a speaker 140 and a microphone 150 serve their respective functions for the radiotelephone 100. The speaker 140 and microphone 150 also serve those functions when the headset is detached from the body 120. 10 As illustrated in FIGS. 3a–3c, the headset 110 is conveniently attached to the radiotelephone body 120 by releasable clasps 130. The shaded illustrations of the headset 110 in FIGS. 3b, 3c represent sections along line A—A in FIG. 3a. As seen in these figures, each clasp 130 advantageously comprises a slot 132 for engaging a generally T-shaped post 134. In FIG. 3b, the posts are pushed into the wider portions of the slots in the direction of the horizontal arrow and then the headset and body are engaged by sliding the headset down in the direction of the vertical arrow so that the crossbars of the T-shaped posts are disposed within the narrower portions of the slots. The headset and body are shown engaged in FIG. 3c. As noted above, the posts and slots may include contacts 136 for electrically connecting the headset to the body. Besides providing a path for communication signals, the contacts 136 may be used for recharging a battery in the headset 110. It will be appreciated that the wiping action obtained when the headset and body are engaged/disengaged helps to keep the surfaces of the contacts 136 clean.

As seen in FIGS. 2b, 2c, the headset 110 may also include a suitable ear clip 160, such as a simple wire loop that fits behind the user's ear to hold the headset securely to a user's head. The ear clip 160 may rotate over a limited range to comfortably accommodate individual users. The user may easily remove the headset 110 from his or her head by simply lifting the ear clip 160 portion of the headset 110 above the ear. It will be appreciated that instead of being held to the user's ear by the clip 160 the user could hold the headset to his or her ear as is done with a conventional telephone handset.

Figure 4A:
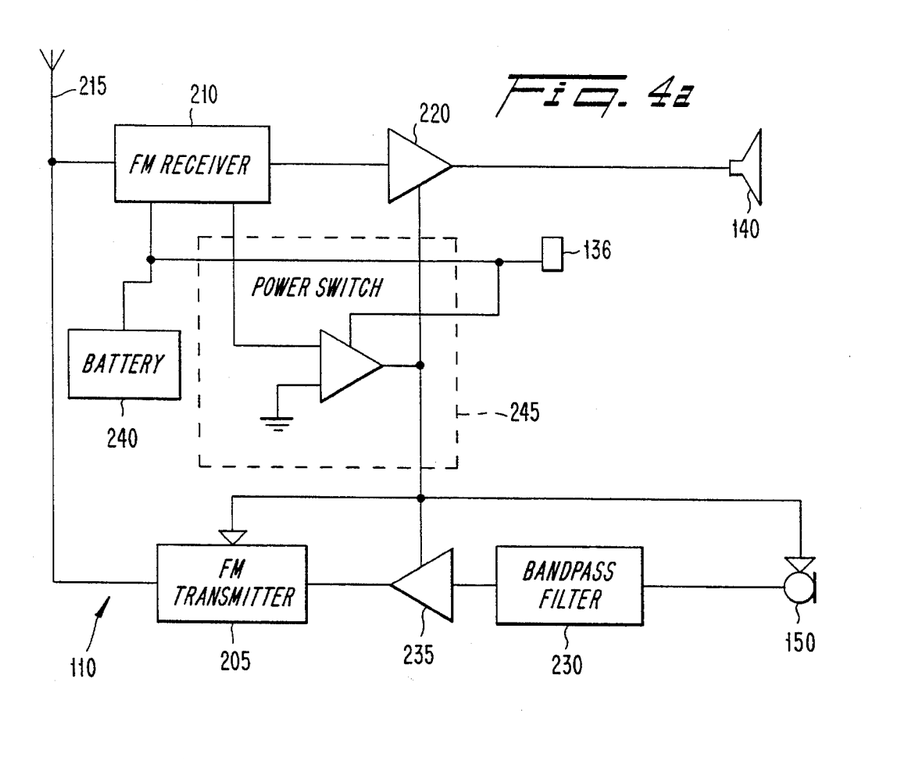
FIGS. 4a, 4b show circuitry for headsets according to the present invention.

Referring to FIG. 4a, the headset 110 includes a transmitter 205 and a receiver 210, which allow for duplex communication with the radiotelephone body 120. To minimize interference and user exposure, an RF power level emitted by the transmitter 205 can be very low, e.g., on the order of tens of microwatts. Thus, the headset can communicate with the radiotelephone body over only short distances, for example, a few meters. It will be appreciated that the body 120 includes circuits comparable to those shown in FIG. 4a.

The headset 110 also includes an antenna 215 for transmitting and receiving signals from the radiotelephone body 120. For RF signals, the antenna may be a small coil or wire disposed within the body of the headset, or it may be located in the ear clip 160. The receiver 210 detects and demodulates the signal from the antenna 215 to produce an audio signal. Several types of modulation may be employed including frequency modulation (FM), pulse width modulation (PWM), amplitude modulation (AM), single sideband AM, quadrature phase shift keying (QPSK), etc. As described below, FM of an RF signal is currently preferred. Rather than RF signals, ultrasonic signals or infrared signals may be exchanged between the radiotelephone body 120 and the headset 110; the antenna, transmitter, and receiver would be modified accordingly.

Figure 5:
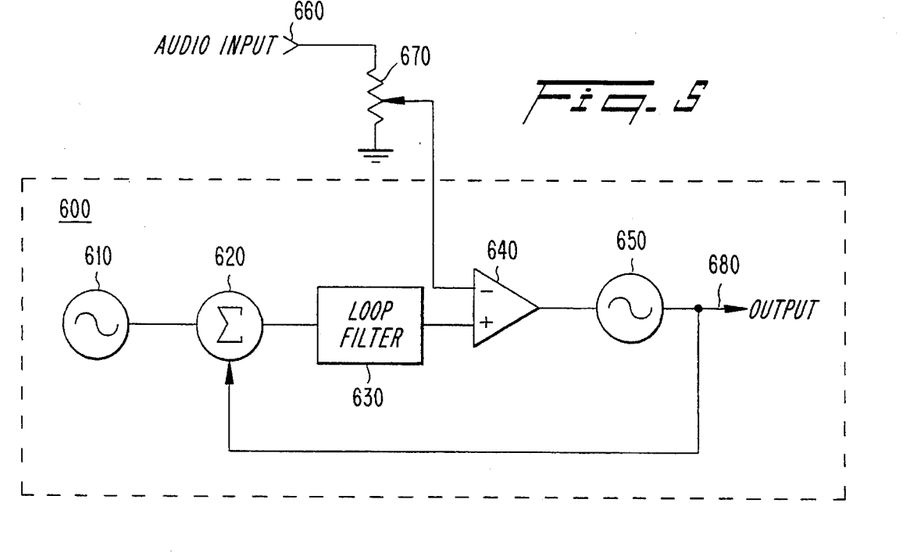
FIG. 5 illustrates an exemplary circuit for obtaining an FM signal having a variable modulation index.

The audio signal produced by the receiver 210 is passed to an audio amplifier 220 and to the speaker 140. The currently preferred way of controlling the volume of the headset 110 involves simply increasing the modulation index of the FM signal sent by the body to the headset. An increased modulation index (i.e., an increased frequency deviation from the nominal center frequency) corresponds to a greater audio volume. FIG. 5 illustrates an exemplary circuit for obtaining such an FM signal having a variable modulation index.

In general, an otherwise conventional phaselocked loop ("PLL") 600 is frequency modulated by adding a modulating voltage to the feedback loop. In the PLL, a part of the loop's output signal 680 is fed back into the loop's summing amplifier 620 where it is compared to a reference signal produced by a reference oscillator 610. The output, or error, signal produced by the amplifier 620 is spectrally shaped by a loop filter 630, and, in a conventional PLL, the result is applied to a voltage-controlled oscillator ("VCO") 650. It will be appreciated that the error signal will drive the frequency of the loop output 680 (i.e., the output signal produced by the VCO 650) toward the frequency of the reference oscillator 610. The output signal produced by the VCO can then be frequency shifted and transmitted in accordance with common radio techniques.

To frequency modulate the loop, an audio input signal 660 is conveniently added to the error signal by a differential amplifier 640. If the bandwidth of the loop filter 630 is such that the frequencies in the audio input signal are outside the loop dynamics, then the instantaneous frequency of the VCO 650 is proportional to the magnitude of the audio input signal. Keeping the loop locked to the reference oscillator 610 ensures that the frequency deviates about the fixed reference frequency. The modulation index of the output signal 680 can be increased simply by increasing the magnitude of the audio input signal, for example by using a voltage divider 670. The divider 670 is preferably controlled by a microprocessor (not shown) in response to actuation of appropriate keys on the body 120.

An advantage of the foregoing volume control arrangement is that no special circuitry or other hardware is required on the receiving end, i.e., in the headset. Also, a simple conventional FM discriminator circuit will automatically produce an audio output signal that is proportional in amplitude and frequency to the modulating audio input signal. If passed through a fixed-gain amplifier 220, the speaker volume will vary accordingly. In this way, the headset can use common, inexpensive circuits that draw little battery power.

Figure 4B:
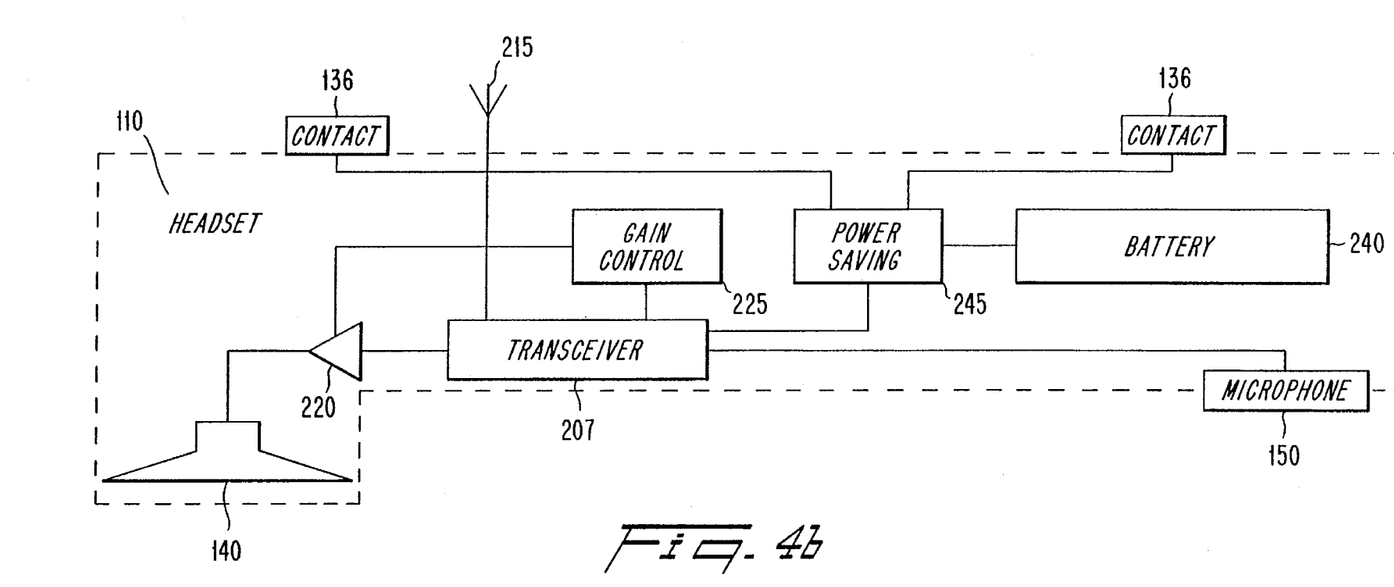

As a more complicated alternative embodiment of the headset 110 that is shown in FIG. 4b, burst PSK data sequences sent by the radiotelephone body 120 cause a gain control circuit 225 to increment or decrement the gain of the amplifier 220. During a message burst, the audio may briefly be muted. A dotting sequence, or special tone, may be sent as a preamble to a volume control command to initiate the muting operation. Thus, the audio volume of the speaker 140 is controlled by the circuit 225, advantageously in response to keys located on the radiotelephone body 120. In FIG. 4b, the transmitter 205 and receiver 210 are represented by a transceiver 207.

The amplified audio signal produced by the amplifier 220 is subsequently applied to the speaker 140 which converts it into sound. A conventional dynamic speaker is preferable for its good sound quality and relatively modest power requirements, but a more compact, piezoelectric speaker may also be used.

In the embodiment illustrated in FIG. 4a, the microphone 150 converts speech uttered by a user of the headset 110 into electrical signals that are supplied to a bandpass filter 230 for reducing extraneous noise. The output of the filter 230 may be amplified by a suitable amplifier 235, the output of which is provided to the transmitter 205. In the embodiment shown in FIG. 4b, the output of the microphone 150 is provided to the transceiver 207, which modulates an RF carrier with that output. It will be appreciated that the transceiver 207 may also include suitable audio signal conditioning components. In either embodiment, a modulated carrier is coupled to the antenna 215 which radiates to the main body 120 of the radiotelephone.

The components in the headset 110 may advantageously be powered by a miniature rechargeable battery 240. The battery 240 may be connected to contacts 136 to provide for recharging the battery when the headset is attached to the radiotelephone body 120. Alternately, means may be provided in the radiotelephone body 120 for inductively coupling energy to the battery. Such inductive coupling devices are well known and used in many rechargeable products to eliminate the direct electrical contact. An inductive coupler may be desirable in that the possibility of failure of the contact, either mechanically or due to environmental contamination, can be avoided. As an alternative, the headset may be powered by RF energy transmitted by the radiotelephone body 120 and the battery omitted. Power transmission RF energy is described in several prior patents and publications, including U.S. Pat. No. 5,009,644 to McDonald; U.S. Pat. No. 5,043,739 to Logan et al.; and U.S. Pat. No. 5,068,669 to Koert et al.

When the headset 110 is stowed, i.e., attached to the body 120, it may receive electric power from the body 120 through the contacts 136 and bypass the battery 240. The battery 240 may be recharged when the headset is attached to the radiotelephone body 120. When the headset 110 is not stowed, the recharging contacts 136 may be deactivated.

Also, the headset 110 may contain a power saving circuit 245 to prolong the life of the rechargeable battery 240. It will be appreciated that in the absence of a signal from the body 120, there is no need to power the audio amplifiers or transmitter circuits in the headset, only the receiver circuit. In the absence of RF-carrier power from the radiotelephone body 120, the power saving circuit 245 shuts down all nonessential circuits thereby reducing battery drain. When the receiver circuit receives an RF signal from the body 120, the receiver (or transceiver) generates a signal that causes the power saving circuit 245, comprising a switch as shown in FIG. 4a, to provide power to the other components.

The receiver can generate the control signal for the circuit 245 based on an increase in the received signal strength indicator ("RSSI"). Such use of the RSSI and receivers including components associated with the RSSI are known. The power saving circuit 245 may easily be realized as part of a monolithic device, which can include the other electronic components of the headset.

Figure 6:
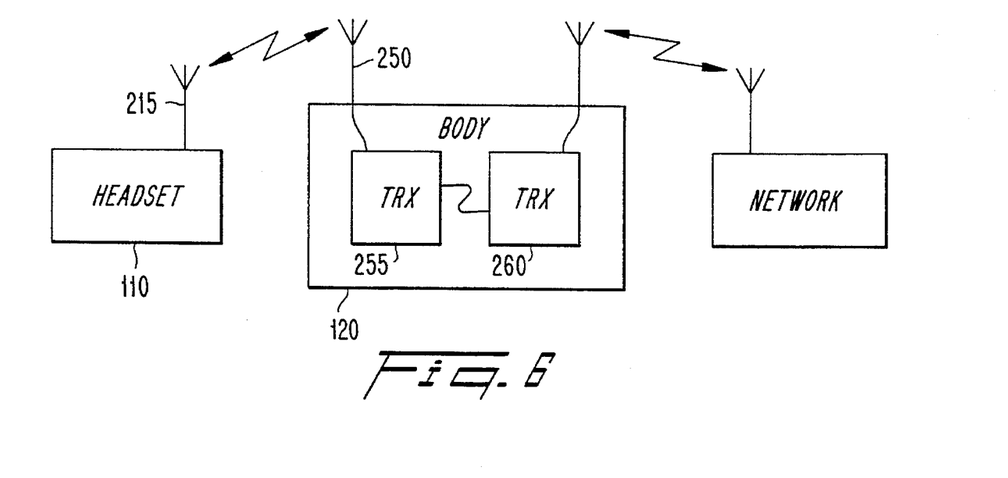
FIG. 6 shows an exemplary radiotelephone body in accordance with Applicant's invention.

As noted above and as illustrated in FIG. 6, an antenna 250 and a low-power transceiver or transmitter and receiver 255 similar to those in the headset 110 are provided in the body 120 of the radiotelephone. The body's components 255 provide and accept signals to and from a suitable transceiver 260 or other means for communicating with a radiotelephone network. Also, the antenna 170 (shown in FIGS. 2a–2c) used by the radiotelephone unit 100 for communicating with the cellular network may be used for two-way wireless communication between the headset 110 and the radiotelephone body 120. Indeed, it will be appreciated that the body's components 255 and/or 260 may perform the function of communicating with the radiotelephone network as well as the function of communicating with the headset, and similar communication signals may be used.

Figure 7:
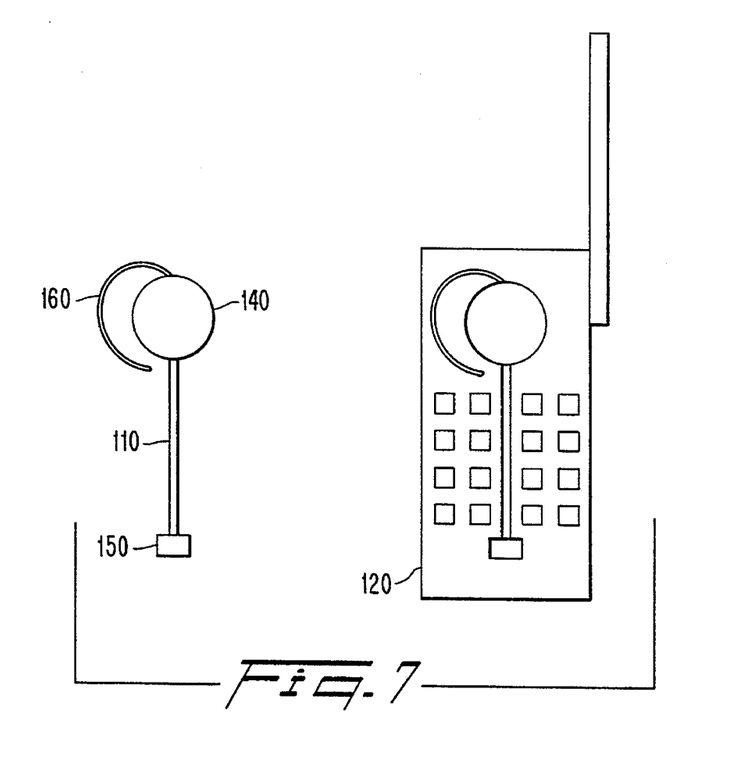
FIG. 7 shows another exemplary radiotelephone apparatus in accordance with Applicant's invention.

Another embodiment of the present invention is illustrated in FIG. 7, which shows the headset 110 stowed within a correspondingly shaped cavity in the radiotelephone body 120. The cavity is preferably shaped so that the headset 110 and body 120 form a compact unit.

While particular embodiments of Applicant's invention have been described and illustrated, it should be understood that his invention is not limited thereto. This application contemplates any and all modifications that fall within the spirit and scope of Applicant's invention as defined by the following claims.

What is claimed is:

1. A radiotelephone apparatus comprising:
   a body, including first means for communicating with a radiotelephone network; and
   a headset, selectively attachable to the body and including second means for communicating with the body, wherein the second means includes:
   means for receiving a modulated carrier signal from a third communications means; and
   means for recovering an audio signal from the modulated carrier signal; and the headset further includes:
   means for amplifying the audio signal recovered by the recovering means; and
   means for converting the audio signal to a sound signal; wherein the body includes the third means for communicating with the headset in one of two modes and, when the headset is attached to the body, the headset and the body are able to exchange information by wired electrical communication and, when the headset is detached from the body, the headset and the body exchange information by wireless communication; and
   the body further includes means for adjusting a gain of the amplifying means.

2. The radiotelephone apparatus of claim 1, wherein the converting means is one of a dynamic speaker and a piezoelectric transducer.

3. The radiotelephone apparatus of claim 1, wherein the headset further includes means for converting a voice signal to a return audio signal, and the second communicating means modulates a return carrier signal according to the return audio signal and transmits the modulated return carrier signal to the third communicating means.

4. The radiotelephone apparatus of claim 1, wherein the headset further includes means for removably attaching the headset to a user's head.

5. The radiotelephone apparatus of claim 4, wherein the attaching means is an ear clip which fits behind a lobe of a user's ear.

6. The radiotelephone apparatus of claim 4, wherein the receiving means is an antenna disposed in the attaching means.

7. The radiotelephone apparatus of claim 1, wherein the headset further includes a battery for supplying electric power to the second communicating means and the amplifying means.

8. The radiotelephone apparatus of claim 7, wherein the headset and body further include releasable clasps, each releasable clasp including a contact connected to the battery, and the body further includes means, connected to a contact, for recharging the battery when the headset is attached to the body.

9. The radiotelephone apparatus of claim 7, wherein the body further includes means for recharging the battery, the recharging means being inductively coupled to the battery when the headset is attached to the body.

10. The radiotelephone apparatus of claim 7, wherein the headset further includes means for reducing power drain from the battery when the receiving means is not receiving a modulated carrier signal.

11. The radiotelephone apparatus of claim 1, wherein the modulated carrier signal is one of a frequency-modulated and pulse-width-modulated signal.

12. The radiotelephone apparatus of claim 1, wherein the body further includes means for transmitting RF energy for powering the headset.

13. The radiotelephone apparatus of claim 1, wherein at least part of the headset is stowed within a cavity in the body when the headset is attached to the body.

* * * * *